United States Patent
Geiss et al.

(10) Patent No.: US 9,544,574 B2
(45) Date of Patent: Jan. 10, 2017

(54) SELECTING CAMERA PAIRS FOR STEREOSCOPIC IMAGING

(71) Applicant: Google Inc., Mountain View, CA (US)

(72) Inventors: Ryan Geiss, San Jose, CA (US); Roman Lewkow, San Jose, CA (US)

(73) Assignee: Google Inc., Mountain View, CA (US)

( * ) Notice: Subject to any disclaimer, the term of this patent is extended or adjusted under 35 U.S.C. 154(b) by 286 days.

(21) Appl. No.: 14/098,818

(22) Filed: Dec. 6, 2013

(65) Prior Publication Data

US 2015/0163478 A1 Jun. 11, 2015

(51) Int. Cl.
*H04N 15/00* (2006.01)
*H04N 13/02* (2006.01)

(52) U.S. Cl.
CPC ................. *H04N 13/0242* (2013.01)

(58) Field of Classification Search
CPC ............ H04N 13/0242; H04N 13/0239; H04N 13/025
USPC .......................................................... 348/47
See application file for complete search history.

(56) References Cited

U.S. PATENT DOCUMENTS

| | | | |
|---|---|---|---|
| 5,978,015 A | 11/1999 | Ishibashi et al. | |
| 7,190,389 B1 | 3/2007 | Abe et al. | |
| 8,134,589 B2 | 3/2012 | Border et al. | |
| 8,294,711 B2 | 10/2012 | Yahagi | |
| 8,553,106 B2 | 10/2013 | Scarff | |
| 8,941,721 B2 * | 1/2015 | Kim | H04N 1/00307 348/207.11 |
| 2002/0030675 A1 * | 3/2002 | Kawai | H04N 13/0014 345/204 |
| 2008/0030592 A1 | 2/2008 | Border et al. | |
| 2008/0049100 A1 | 2/2008 | Lipton et al. | |

(Continued)

FOREIGN PATENT DOCUMENTS

| | | |
|---|---|---|
| JP | 08-116553 | 5/1996 |
| JP | 2001-022014 | 1/2001 |

(Continued)

OTHER PUBLICATIONS

International Searching Authority, International Search Report and Written Opinion for PCT/US2014/068520 mailed Feb. 25, 2015, 9 pages.

(Continued)

*Primary Examiner* — Thai Tran
*Assistant Examiner* — Jose Mesa
(74) *Attorney, Agent, or Firm* — McDonnell Boehnen Hulbert & Berghoff LLP

(57) ABSTRACT

An example method involves: (a) determining an indication of distance to an object in a scene, wherein the computing device comprises three or more image-capture devices that provide two or more baselines for stereoscopic imaging, wherein at least two pairs of image-capture devices from the three or more image-capture devices are operable for stereoscopic imaging, wherein each pair provides one of the baselines, and wherein a first of the baselines is non-parallel to a second of the baselines, (b) selecting, by the computing device, a first pair from the at least two pairs of image-capture devices, wherein the first pair is selected based on the indication of distance and the baseline provided by the first pair, and (c) operating the first pair of image-capture devices to capture stereoscopic image data.

13 Claims, 9 Drawing Sheets

(56) References Cited

U.S. PATENT DOCUMENTS

| | | | |
|---|---|---|---|
| 2011/0311130 A1 | 12/2011 | Ichimori | |
| 2012/0075489 A1 | 3/2012 | Nishihara | |
| 2013/0011045 A1* | 1/2013 | Lee | H04N 13/0022 |
| | | | 382/154 |
| 2013/0076866 A1* | 3/2013 | Drinkard | H04N 7/181 |
| | | | 348/47 |
| 2013/0147923 A1* | 6/2013 | Zhou | H04B 3/20 |
| | | | 348/47 |
| 2014/0043445 A1* | 2/2014 | Zhang | H04N 13/0242 |
| | | | 348/48 |
| 2014/0347439 A1* | 11/2014 | Jia | H04N 5/23238 |
| | | | 348/36 |

FOREIGN PATENT DOCUMENTS

| | | |
|---|---|---|
| JP | 2010-081010 | 4/2010 |
| WO | 2010147609 | 12/2010 |

OTHER PUBLICATIONS

Low, Aloysius; CNET article titled "Corephotonics' dual-camera tech will change smartphone imaging" dated Feb. 27, 2014.

\* cited by examiner

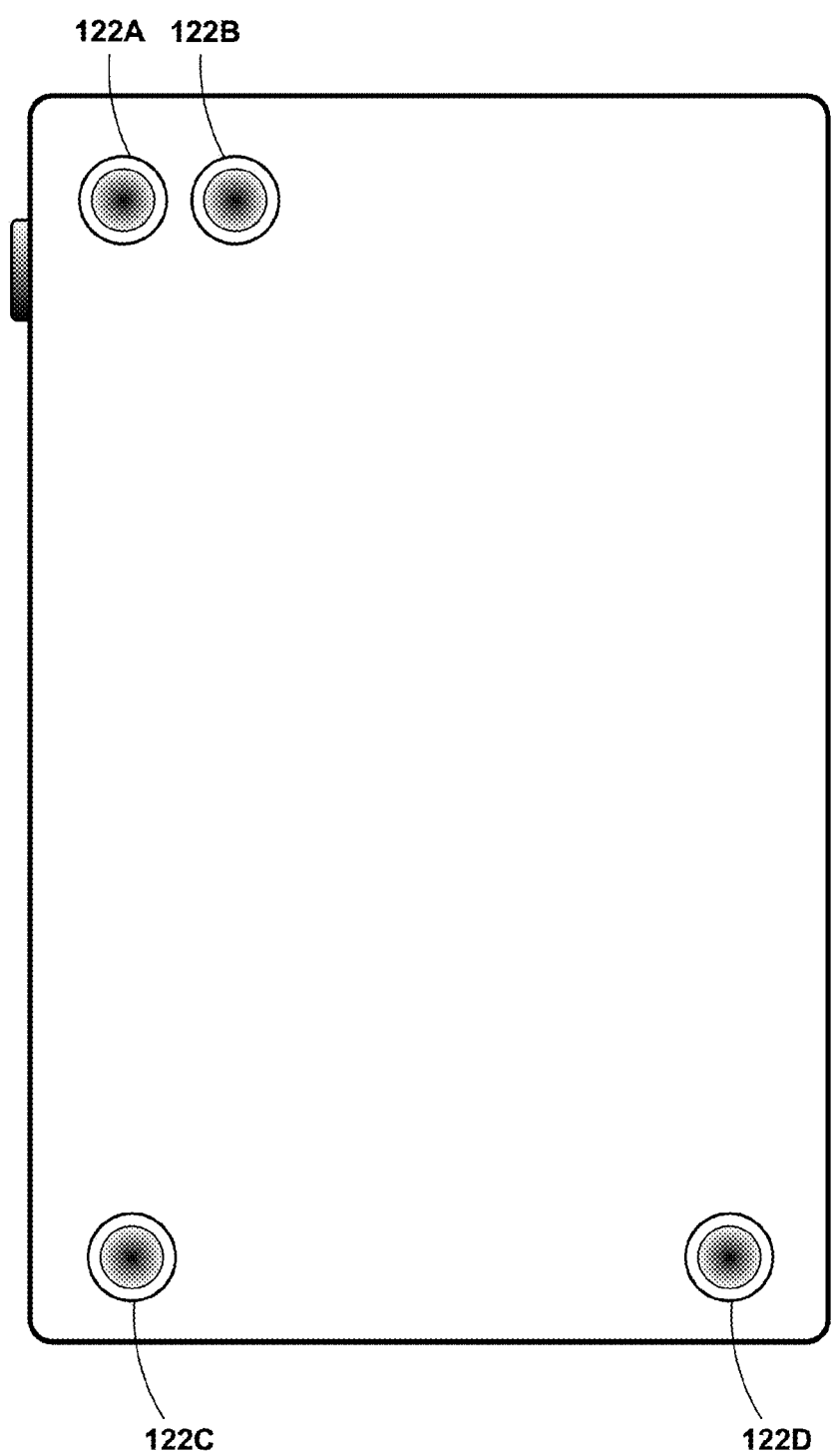

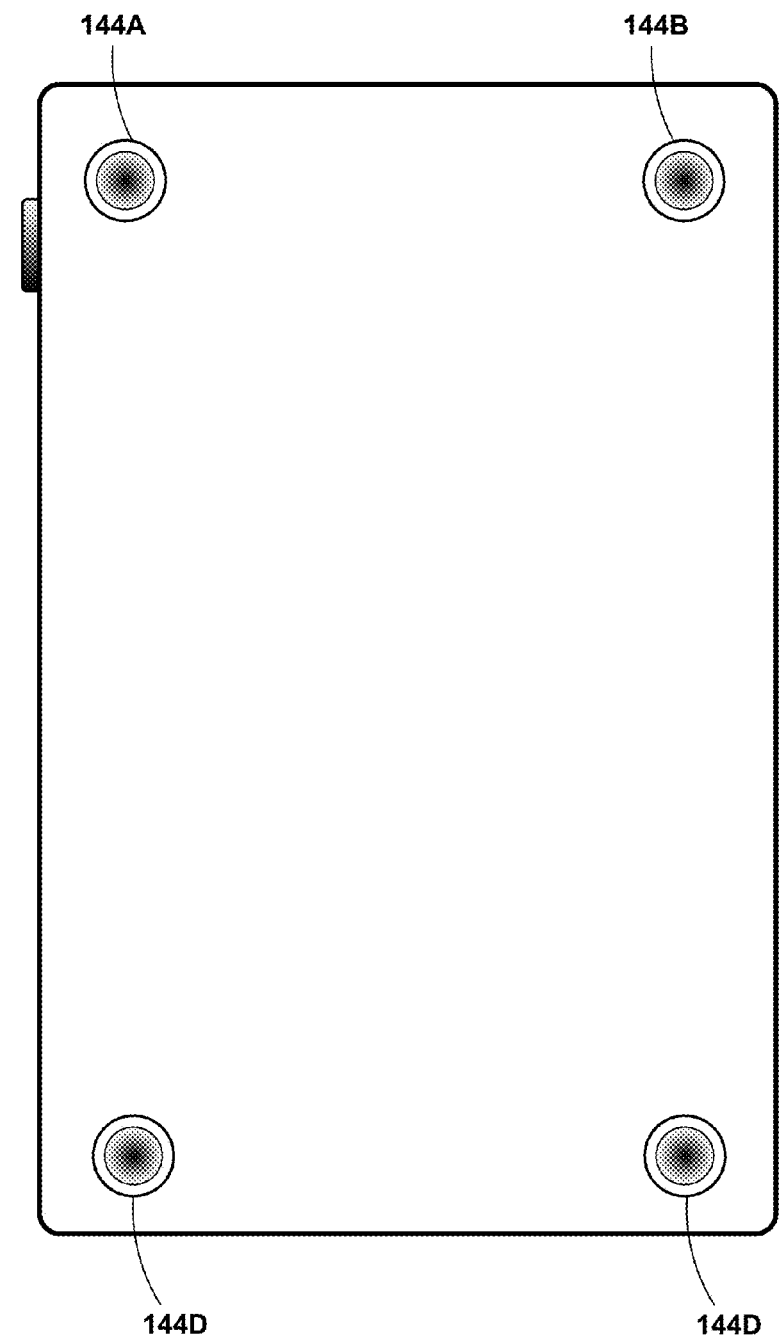

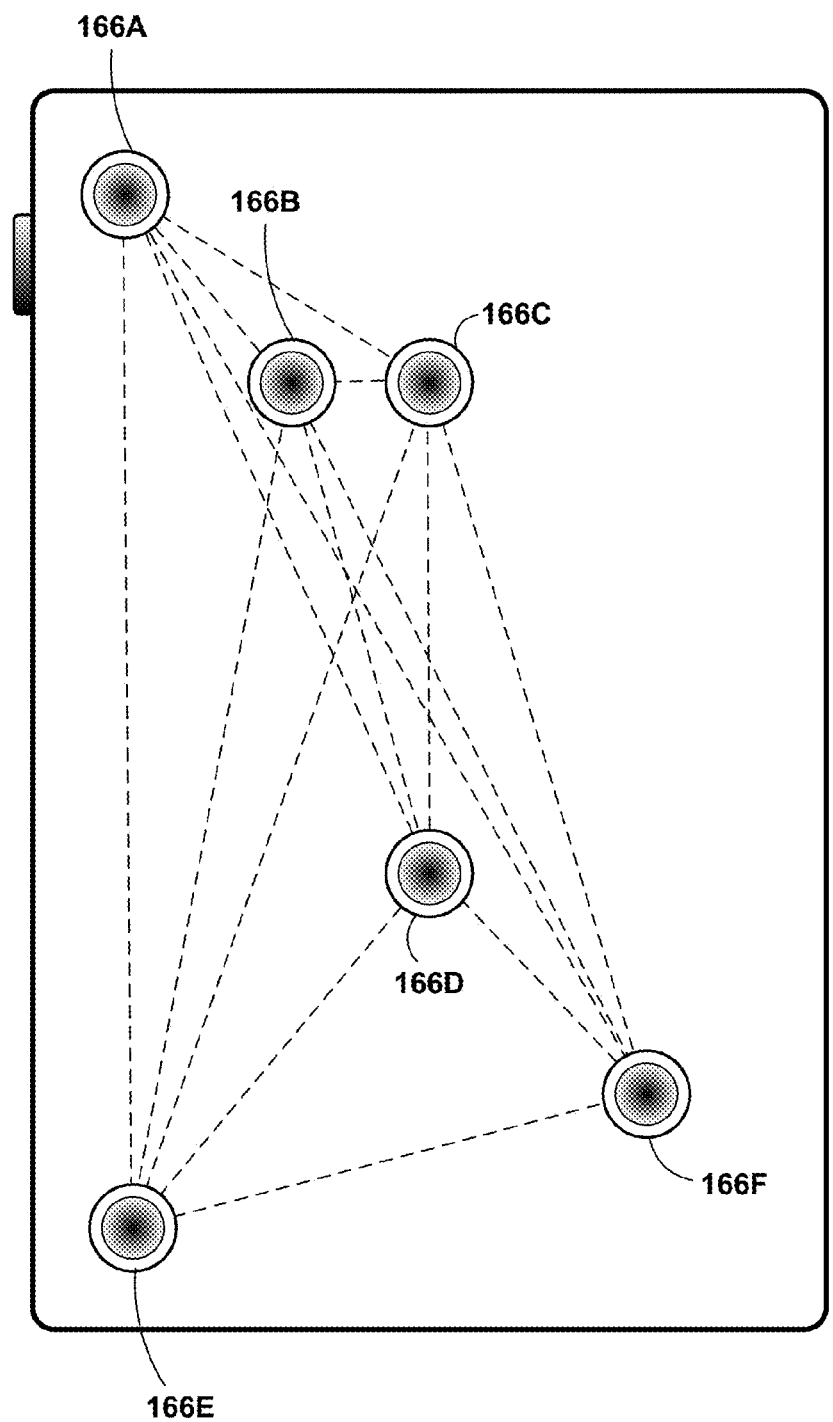

SELECTING CAMERA PAIRS FOR STEREOSCOPIC IMAGING

BACKGROUND

Generally, imaging may refer to capturing and representing the color and brightness characteristics of a real-world environment in a digital format and/or a film format (e.g., in photographs and/or motion video). A large variety of image capture devices exist, thus providing consumers with numerous ways to capturing image data.

As image capture devices, such as cameras, become more popular, such devices may be employed as standalone hardware devices or integrated into various other types of devices. For instance, still and video cameras are now regularly included in wireless communication devices (e.g., mobile phones), tablet computers, laptop computers, video game interfaces, home automation devices, and even automobiles and other types of vehicles.

In stereoscopic imaging (also referred to as "3D imaging"), two cameras that are offset from one another are used to simultaneously capture two perspectives of a scene. The distance by which the two lenses are offset may be referred to as the "baseline" or the "interaxial separation." Some stereoscopic imaging systems have a baseline that is similar to the distance between a person's eyes. Configured as such, a stereo imaging system may capture a scene in a similar manner as the human eyes perceive the scene. However, for various reasons, other stereo imaging systems may utilize baselines that are larger or smaller than the typical distance between a human's eyes.

A pair of images of a scene that are captured by a pair of offset cameras may be referred to as "stereo image pair." A stereo image pair may be utilized in various ways. In particular, a stereo image pair may be combined to form a "viewable stereoscopic image" (also referred to as a "3D image"). When viewed on a stereoscopic display, and possibly with the aid of a stereoscopic viewer (e.g., 3D glasses), the human brain perceives such 3D images as having depth.

Further, stereo image pairs may provide depth information about a scene. In particular, the disparity between objects in a scene may be determined by comparing the individual images in a stereo image pair of the scene. Provided with the disparity of a particular object and the known baseline of the stereo imaging system used to capture the stereo image pair, the distance to the object may be calculated.

SUMMARY

Example embodiments may take the form of, be implemented by, or otherwise relate to a device, such as s mobile phone, which includes three or more camera systems that are oriented in the same direction and separated by some distance. In an example embodiment, different pairs of the cameras may provide different baselines (i.e., different distances between the lenses of the camera pairs). The particular baseline that is appropriate for capture of a stereo image pair may vary depending upon the particular scene being captured; and in particular, may vary according to the distance to the objects in the scene that are being focused on. Accordingly, an example method may help to intelligently select a camera pair for stereo imaging by determining a baseline that is appropriate (and possibly optimal) for a particular scene, and then selecting a camera pair that provides the determined baseline (or at least provides a baseline that is as close as possible to the desired baseline).

In one aspect, an example method for image capture involves a computing device: (a) determining an indication of distance to an object in a scene, wherein the computing device comprises three or more image-capture devices that provide two or more baselines for stereoscopic imaging, wherein at least two pairs of image-capture devices from the three or more image-capture devices are operable for stereoscopic imaging, wherein each pair provides one of the baselines, and wherein a first of the baselines is non-parallel to a second of the baselines, (b) selecting a first pair from the at least two pairs of image-capture devices, wherein the first pair is selected based on the indication of distance and the baseline provided by the first pair, and (c) operating the first pair of image-capture devices to capture stereoscopic image data.

In another aspect, an example apparatus includes three or more image-capture systems, wherein lenses of the image-capture systems are all arranged on a first surface of the apparatus and oriented in substantially the same direction, wherein the three or more image-capture systems provide two or more baselines for stereoscopic imaging, wherein at least two pairs of image-capture devices from the three or more image-capture devices are operable for stereoscopic imaging, wherein each pair provides one of the baselines, and wherein a first of the baselines is non-parallel to a second of the baselines. The apparatus further includes a control system configured to: (a) determine an indication of distance to an object in a scene, (b) select a first pair from the at least two pairs of image-capture devices, wherein the first pair is selected based on the indication of distance and the baseline provided by the first pair, and (c) operate the first pair of image-capture devices to capture stereoscopic image data.

In a further aspect, an example method for image capture involves a computing device: (i) receiving one or more stereo image pairs, wherein each stereo image pair comprises two images of a first scene, wherein each stereo image pair is captured by a different pair of image-capture devices from three or more image-capture devices on the same computing devices, and wherein the three or more image-capture devices provide two or more different baselines, (ii) for each of one or more of the stereo image pairs, determining a difference between the images in the pair, (iii) selecting at least one of the stereo image pairs of the first scene, wherein the selecting of the at least one selected pair is based at least in part on the comparison of: (a) the determined difference between the images in the pair and (b) a target difference, and (iv) using the selected stereo image pair as a basis for generating data that corresponds to the first scene.

In another aspect, a system includes: (a) means for determining an indication of distance to an object in a scene, wherein the computing device comprises three or more image-capture devices that provide two or more baselines for stereoscopic imaging, wherein at least two pairs of image-capture devices from the three or more image-capture devices are operable for stereoscopic imaging, wherein each pair provides one of the baselines, and wherein a first of the baselines is non-parallel to a second of the baselines, (b) means for selecting a first pair from the at least two pairs of image-capture devices, wherein the first pair is selected based on the indication of distance and the baseline provided by the first pair, and (c) means for operating the first pair of image-capture devices to capture stereoscopic image data.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

FIG. 1B shows a digital camera device with an arrangement of four cameras oriented in the same direction, in accordance with an example embodiment.

FIG. 1C shows another digital camera device with an arrangement of four cameras oriented in the same direction, in accordance with an example embodiment.

FIG. 1D shows a digital camera device with an arrangement of six cameras oriented in the same direction, in accordance with an example embodiment.

DETAILED DESCRIPTION

Figure 1A:
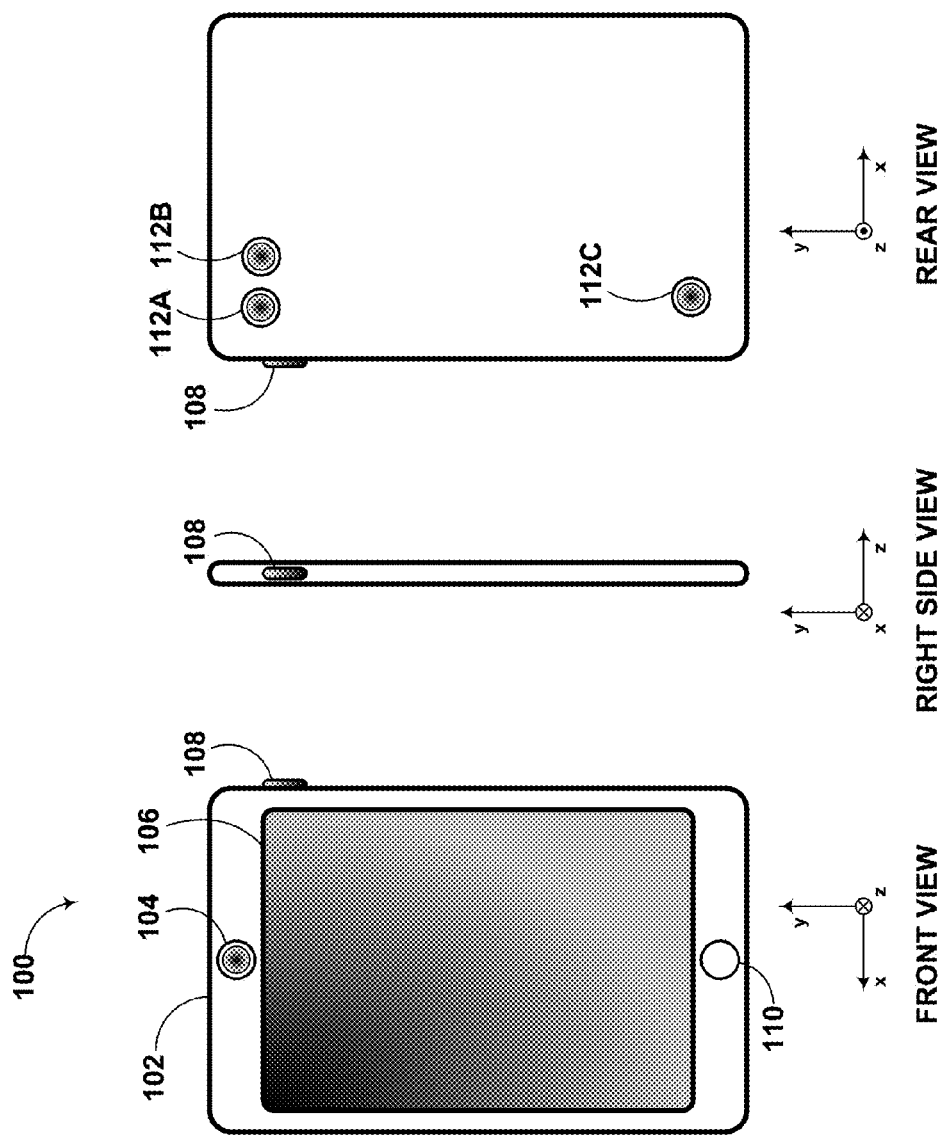
FIG. 1A depicts front, right side, and rear views of a digital camera device, in accordance with an example embodiment.

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations, all of which are contemplated herein.

I. Overview

To capture a stereo image pair, two cameras that are offset from one another and oriented in substantially the same direction may be used to simultaneously capture image data of the same scene from different perspectives. In some cases, the individual images of a scene that form a stereo image pair may also be captured at different times (i.e., non-simultaneously). Collectively, one or more pairs of such offset images of a scene may be referred to as "stereo image data." Stereo image data may be processed in order to produce one or more human-viewable stereo images, which may each be referred to herein as a "viewable stereoscopic image" or "3D image." Additionally or alternatively, stereo image data may be analyzed to extract depth information about the scene. In particular, objects or points in the scene can be mapped in a three-dimensional (3D) coordinate system based on the disparity between the objects or points in the two images of the scene.

In the context of stereoscopic imaging, different baselines may be desirable, depending upon the desired use of the resulting stereo image data. Accordingly, illustrative devices may include three or more camera systems (e.g., three or more lenses that are part of a single camera, or three or more separate cameras), for which the lenses are oriented in substantially the same direction, and thus can provide multiple baselines for stereoscopic imaging by using different pairs of cameras. As such, example embodiments may intelligently adjust the baseline for a particular scene by selecting a camera pair with a baseline that is desirable to capture the scene. The camera pair may be selected based on various factors, such as the characteristics of the particular scene that is being captured and/or the purpose for which the stereoscopic image data is being captured, among other possible factors.

As an example, to produce a viewable stereoscopic image that replicates what the human eyes would see if at the scene, a baseline between 50 mm and 80 mm is typically used. However, if the intended subject of a viewable stereoscopic image is distant (e.g., a large building that is 100 feet away), then using such a baseline will typically cause the object to appear flat when the stereoscopic image data is combined to produce a viewable stereoscopic image. Accordingly, if the subject is further away, a wider baseline may result in a viewable stereoscopic image in which the subject has greater depth. Or, in some scenarios, a wider baseline may be selected to provide for exaggerated depth in a stereoscopic image produced from a stereo image pair. Similarly, if the intended subject is very close to the lenses (e.g., 1-2 inches away), then a "standard" baseline between 50 mm and 80 mm may result in a viewable stereoscopic image with undesirable parallax. Accordingly, a narrower baseline may be used for such stereoscopic close-up images, which may also be referred to as "macro stereo" images, such that a stereoscopic image generated from a macro stereo image pair is easier to view.

Further, in some applications, different baselines may be selected to achieve various artistic effects by, e.g., increasing or decreasing the resulting depth, as compared to the depth that is perceived by the human eyes. Further, in some applications, different baselines may be selected to achieve various artistic effects by, e.g., increasing or decreasing the resulting depth, as compared to the depth that is perceived by the human eyes. For example, wider or narrower baselines may be respectively selected in order to exaggerate or reduce the disparity between the two images, which in turn can make the depth in a resulting stereoscopic image easier to perceive (in a distant scene), or more difficult to perceive (in a macro scene), respectively.

In some embodiments, an illustrative camera system may be configured to automatically determine the distance to an intended subject for an image, and to select one an appropriate baseline for capturing the image, based on the distance to the intended subject. Various techniques could be used to determine the distance to the subject. For example, once a subject is detected, auto-focus may be used to focus on the subject. The resulting lens position that brings the subject into focus may indicate the distance to the subject (at least to within a certain range). Note that if a different lens is used for the autofocus, then the resulting focus setting may need to be calibrated to account for the offset between the lens used for auto-focus and the lenses being used for imaging.

Alternatively, the device might start the process of determining an appropriate camera pair for stereo imaging by first capturing stereoscopic image data with a pair of cameras that provide a certain baseline, and then determining the difference between the individual images that are captured. Note that the difference may be weighted more heavily in an area of the image frame that includes an intended subject. If the difference is larger than a desired difference, then the device may repeatedly reduce the baseline (e.g., by using different pair(s) of cameras) and evaluate the resulting image data, until the desired difference between the individual images is achieved (or until the difference is within some threshold amount from the desired difference). Note that this method for determining the appropriate baseline does not require calibrated autofocus, and thus may be particularly useful in cameras that lack this feature.

In a further aspect, a camera pair may be selected in order to provide a baseline that helps to improve, or simplifies the process of determining, depth information for the scene. For example, when creating a depth map for a scene, it may be desirable to control the amount of parallax. More specifically, if a stereo image pair of a distant scene is captured with a baseline similar to the typical interocular separation (i.e., a human-eye-like separation), then the amount of parallax may be small, such that depth information is difficult to extract and/or inaccurate. On the other hand, if a stereo image pair of a close-up (i.e., macro) scene is captured with a baseline similar to the typical human interocular separation, the parallax of the stereo image pair may be too much; possibly to the point where left and right image of a scene (or a close-up object in the scene) are non-overlapping. Such extreme parallax may make it difficult to obtain depth information from a stereo image pair.

Accordingly, illustrative multi-camera systems may dynamically select a camera pair with a baseline that facilitates obtaining depth information at the general distance range of the scene. For example, a camera pair with a standard baseline (e.g., similar to the typical interocular separation) may be selected for subjects at an intermediate distance range, a camera pair with a comparatively smaller baseline may be selected for close-up scenes, and a camera pair with a comparatively larger baseline may be selected for distant scenes. Other examples are also possible.

II. Illustrative Systems

The physical components of an image capture device may include an aperture through which light enters, a recording surface for capturing the image represented by the light, and a lens positioned in front of the aperture to focus at least part of the image on the recording surface. The aperture may be fixed size or adjustable. In an analog camera, the recording surface may be photographic film. In a digital camera, the recording surface may include an electronic image sensor (e.g., a charge coupled device (CCD) or a complementary metal-oxide-semiconductor (CMOS) sensor) to transfer and/or store captured images in a data storage unit (e.g., memory).

A shutter may be coupled to or nearby the lens or the recording surface. The shutter may either be in a closed position, in which it blocks light from reaching the recording surface, or an open position, in which light is allowed to reach to recording surface. The position of the shutter may be controlled by a shutter button. For instance, the shutter may be in the closed position by default. When the shutter button is triggered (e.g., pressed), the shutter may change from the closed position to the open position for a period of time, known as the shutter cycle. During the shutter cycle, an image may be captured on the recording surface. At the end of the shutter cycle, the shutter may change back to the closed position.

Alternatively, the shuttering process may be electronic. For example, before an electronic shutter of a CCD image sensor is "opened" the sensor may be reset to remove any residual signal in its photodiodes. While the electronic shutter remains open, the photodiodes may accumulate charge. When or after the shutter closes, these charges may be transferred to longer-term data storage. Combinations of mechanical and electronic shuttering may also be possible.

Regardless of type, a shutter may be activated and/or controlled by something other than a shutter button. For instance, the shutter may be activated by a softkey, a timer, or some other trigger. Herein, the term "image capture" may refer to any mechanical and/or electronic shuttering process that results in one or more photographs being recorded, regardless of how the shuttering process is triggered or controlled.

A. Devices with Multiple Image-Capture Systems

As noted previously, digital cameras may be standalone devices or integrated with other devices. As an example, FIG. 1A illustrates the form factor of a digital camera device 100. Digital camera device 100 may be, for example, a mobile phone, a tablet computer, or a wearable computing device. However, other embodiments are possible. Digital camera device 100 may include various elements, such as a body 102, a front-facing camera 104, a multi-element display 106, a shutter button 108, and other buttons 110. Digital camera device 100 could further include three rear-facing cameras 112A to 112C. Front-facing camera 104 may be positioned on a side of body 102 typically facing a user while in operation, or on the same side as multi-element display 106. Rear-facing cameras 112A to 112C may be positioned on a side of body 102 opposite front-facing camera 104. Referring to the cameras as front and rear facing is arbitrary, and digital camera device 100 may include multiple cameras positioned on various sides of body 102.

The lenses of rear-facing cameras 112A and 112B are arranged on the upper corner on the back of digital camera device 100, while the lens of camera 112C is arranged on the lower corner on the back of device 100, opposite of camera 112A. Further, the lenses of rear-facing cameras 112 to 112C are oriented in substantially the same direction. (Note that herein, references to a cameras being oriented in the same direction should be understood to mean that the lenses of the cameras point in substantially the same direction.)

It should be understood that other multi-camera arrangements are possible. In particular, the lenses of three or more cameras, which are all oriented in substantially the same direction, may be arranged in different formations on a surface of the phone. For instance, several other multi-camera arrangements are described herein with respect to FIGS. 1B to 1E.

In particular, FIG. 1B shows a mobile device 120 with an arrangement of four cameras 122A to 122D oriented in the same direction, including two cameras 122A and 122B in the upper corner of the mobile device (similar to FIG. 1A), and two additional cameras 122C and 122D that are located at the lower corners of the mobile device 120. Further, FIG. 1C shows another arrangement with four cameras oriented in the same direction. In particular, the arrangement in FIG. 1C includes one camera 144A to 144D in each corner of the device 140.

Yet further, FIG. 1D shows an arrangement with six cameras 166A to 166F facing in the same direction. In FIG. 1D, the six cameras 166A to 166F are placed on the back of the mobile device 160 in less-structured, "organic," arrangement. Note that an arrangement with three or more cameras may provide multiple baselines between different pairs of cameras. For instance, a six-camera arrangement such as that shown in FIG. 1D may provide up to 15 different baselines for, e.g., stereoscopic imaging. More generally, an arrangement of n cameras that are oriented in substantially the same direction may provide up to C(n, k) baselines.

Figure 1E:
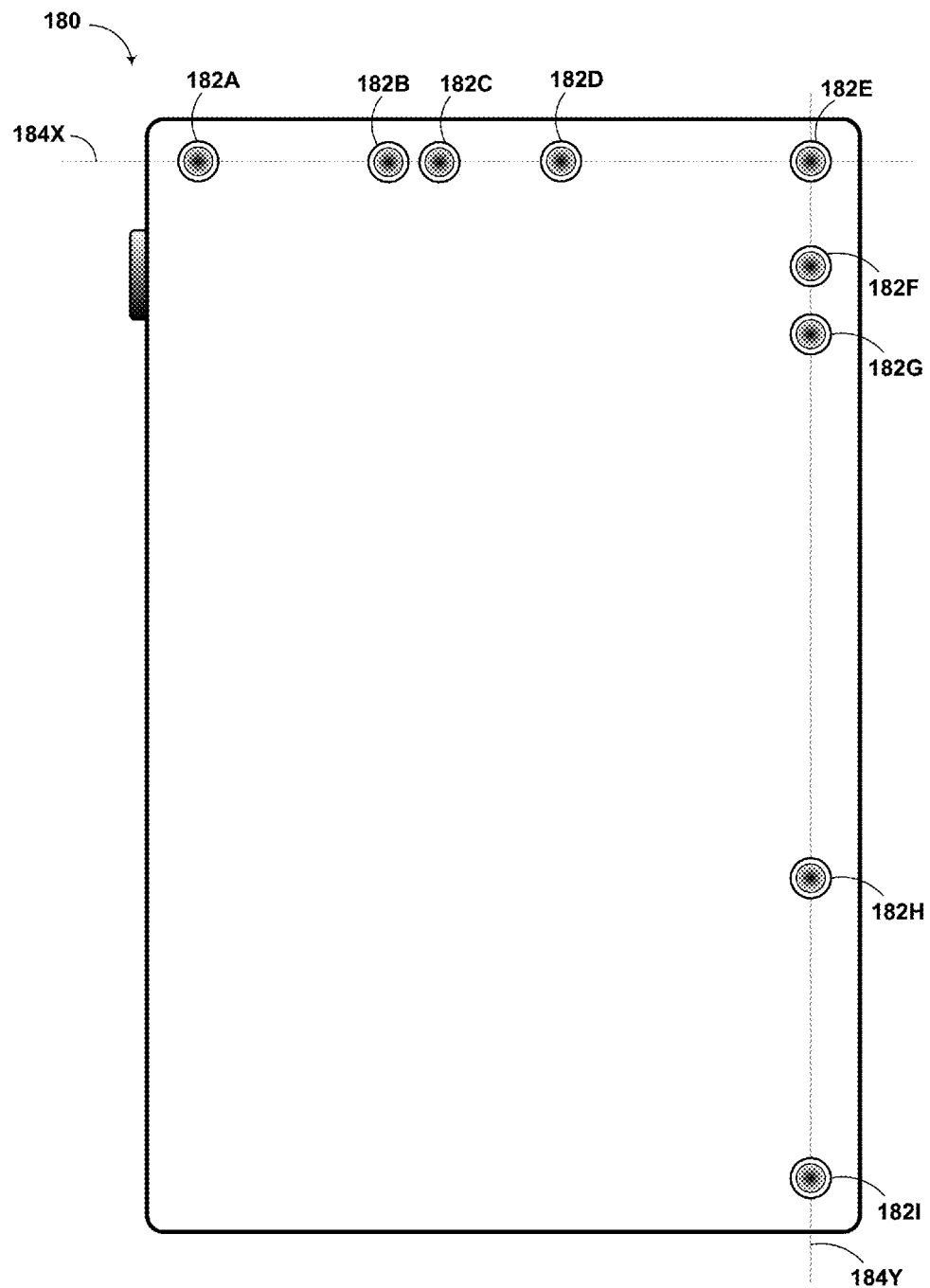
FIG. 1E shows another digital camera device with a multi-camera arrangement, in accordance with an example embodiment.

In another variation, FIG. 1E shows an arrangement with nine cameras 182A to 182I facing in the same direction. In FIG. 1E, the nine cameras 182A to 182F are placed on the back of the mobile device 180 along two axes 184X and 184Y. Accordingly, different pairs of cameras may be selected from cameras 182A to 182F to provide a number of different baselines along the two axes 184X and 184Y, as well as a number of different off-axis baselines.

It is contemplated that other multi-camera arrangements may include more or fewer cameras than those shown in FIGS. 1A to 1E. In addition, the lenses in a multi-camera arrangement may be oriented at a different angle with respect to the surface on which the lenses are arranged. Yet further, it should be understood that multi-camera arrangements may be implemented on other sides of a digital camera device. Other variations on the multi-camera arrangements shown in the figures are also possible.

Multi-element display 106 could represent a cathode ray tube (CRT) display, a light emitting diode (LED) display, a liquid crystal (LCD) display, a plasma display, or any other type of display known in the art. In some embodiments, multi-element display 106 may display a digital representation of the current image being captured by front-facing camera 104 and/or one, some, or all of rear-facing cameras 112A to 112C, or an image that could be captured or was recently captured by any one of or any combination of these cameras. Thus, multi-element display 106 may serve as a viewfinder for either camera. Multi-element display 106 may also support touchscreen and/or presence-sensitive functions that may be able to adjust the settings and/or configuration of any aspect of digital camera device 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing cameras 112A to 112C may be similarly or differently arranged. Additionally, front-facing camera 104, each rear-facing camera 112A to 112C, or any combination of these cameras, may in fact be an array of one or more cameras (or an array of lenses that direct light onto a common image sensor).

Any one or any combination of front facing camera 104 and rear-facing cameras 112A to 112C may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

Any one or any combination of front facing camera 104 and rear-facing cameras 112A to 112C may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. Additionally, the ambient light sensor's input may be used to determine an exposure setting of an associated camera, or to help in this determination.

Digital camera device 100 could be configured to use multi-element display 106 and either front-facing camera 104 or one, some, or all of rear-facing cameras 112A to 112C to capture images of a target object. The captured images could be a plurality of still images or a video stream. The image capture could be triggered by activating shutter button 108, pressing a softkey on multi-element display 106, or by some other mechanism. Depending upon the implementation, the images could be captured automatically at a specific time interval, for example, upon pressing shutter button 108, upon appropriate lighting conditions of the target object, upon moving digital camera device 100 a predetermined distance, or according to a predetermined capture schedule.

B. Illustrative Device Components

Figure 2:
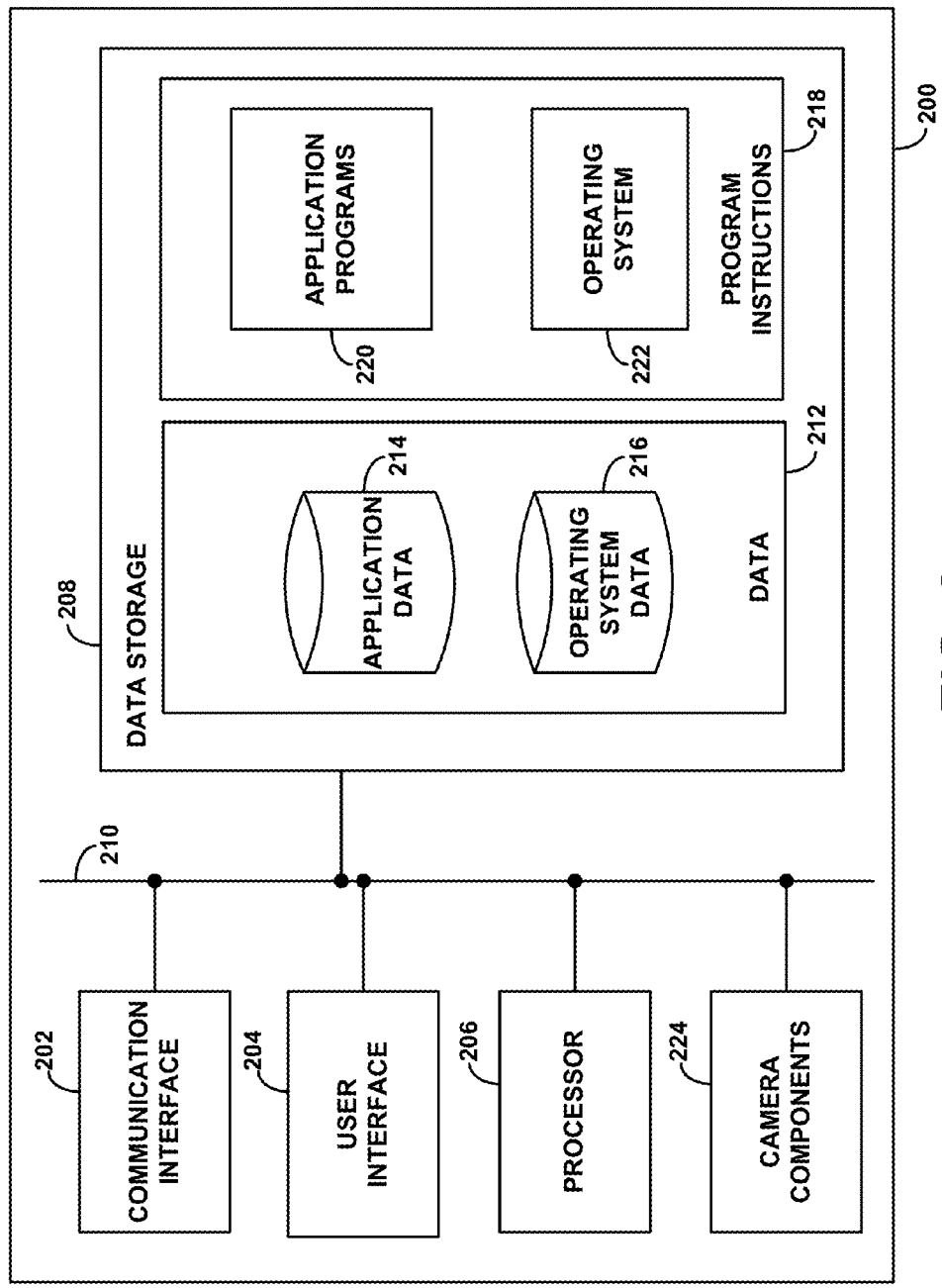
FIG. 2 is a simplified block diagram showing some of the components of an example computing device that may include camera components.

As noted above, the functions of digital camera device 100—or another type of digital camera—may be integrated into or take the form of a computing device, such as a mobile phone, tablet computer, laptop computer and so on. For purposes of example, FIG. 2 is a simplified block diagram showing some of the components of an example computing device 200 that may include camera components 224. Camera components 224 may include multiple cameras, such as cameras 112A to 112C.

By way of example and without limitation, computing device 200 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, or some other type of device equipped with at least some image capture and/or image processing capabilities. It should be understood that computing device 200 may represent a physical camera device such as a digital camera, a particular physical hardware platform on which a camera application operates in software, or other combinations of hardware and software that are configured to carry out camera functions.

As shown in FIG. 2, computing device 200 may include a communication interface 202, a user interface 204, a processor 206, data storage 208, and camera components 224, all of which may be communicatively linked together by a system bus, network, or other connection mechanism 210.

Communication interface 202 may function to allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wifi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive or presence-sensitive panel, computer mouse, trackball, joystick, microphone, and so on. User interface 204 may also include one or more output components such as a display screen which, for example, may be combined with a presence-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices.

In some embodiments, user interface 204 may include a display that serves as a viewfinder for still camera and/or video camera functions supported by computing device 200. Additionally, user interface 204 may include one or more buttons, switches, knobs, and/or dials that facilitate the configuration and focusing of a camera function and the capturing of images (e.g., capturing a picture). It may be possible that some or all of these buttons, switches, knobs, and/or dials are implemented as functions on a presence-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or functions disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, and/or gaming applications) installed on computing device 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some vernaculars, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface (e.g., photographic film and/or an image sensor), lens, and/or shutter button. Camera components 224 may be controlled at least in part by software executed by processor 206. Further, camera components 224 may include multiple camera systems, which each include an aperture, shutter, recording surface lens, image sensor, processor, and/or shutter button.

When multiple camera systems are included, there may be some components that are shared between the systems, and other components that are not shared. For example, each camera could include its own aperture, lens, and image sensor, while sharing other components such as a processor and a shutter button. As another example, each camera could include its own lens, but share the same image sensor. Alternatively, each camera system's components may be utilized only for that camera system, and not shared with other camera systems.

C. Digital Images

A still camera may capture one or more images each time image capture is triggered. A video camera may continuously capture images at a particular rate (e.g., 24 images—or frames—per second) as long as image capture remains triggered (e.g., while the shutter button is held down). Some digital still cameras may open the shutter when the camera device or application is activated, and the shutter may remain in this position until the camera device or application is deactivated. While the shutter is open, the camera device or application may capture and display a representation of a scene on a viewfinder. When image capture is triggered, one or more distinct digital images of the current scene may be captured. Note that example embodiments may utilize cameras with electronic shutters and/or mechanical shutters.

Captured digital images may be represented as a one-dimensional, two-dimensional, or multi-dimensional array of pixels. Each pixel may be represented by one or more values that may encode the respective pixel's color and/or brightness. For example, one possible encoding uses the YCbCr color model (which may also be referred to as the YUV color model). In this color model, the Y color channel may represent the brightness of a pixel, and the Cb (U) and Cr (V) color channels may represent the blue chrominance and red chrominance, respectively, of the pixel. For instance, each of these color channels may take values from 0 to 255 (i.e., the tonal range that a single 8-bit byte can offer). Thus, the brightness of a pixel may be represented by a 0 or a value near zero if the pixel is black or close to black, and by a 255 or a value near 255 if the pixel is white or close to white. However, the value of 255 is a non-limiting reference point, and some implementations may use different number of bits for pixel value representation (e.g., 10, 12, etc.).

Nonetheless, the YCbCr color model is just one possible color model, and other color models such as a red-green-blue (RGB) color model or a cyan-magenta-yellow-key (CMYK) may be employed with the embodiments herein. Further, the pixels in an image may be represented in various file formats, including raw (uncompressed) formats, or compressed formats such as Joint Photographic Experts Group (JPEG), Portable Network Graphics (PNG), Graphics Interchange Format (GIF), and so on.

D. Autofocus

Generally, an autofocus (AF) system may include a sensor of some kind, a control system that automatically determines focus settings, and an actuator to adjust the mechanical components of the camera (e.g., the lens) according to the focus settings. The data provided by the sensor may be used to evaluate the manner in which the environment is or will be recorded by an image sensor, and to responsively control an electro-mechanical system that can change the focus of camera (e.g., by using an actuator to move components of the lens and/or changing the size of the aperture). Various types of autofocus techniques may be utilized by an image capture device, such as digital camera device 100.

Many consumer cameras include passive autofocus systems, which focus the lens on a subject by passively analyzing the image that is entering the optical system (e.g., they do not direct controlled beams of light on the subject in order to focus). Typical passive autofocus techniques include "phase detection" autofocus (PD-AF) and "contrast detection" autofocus (CD-AF), which may also be referred to as "contrast measurement" autofocus.

Passive autofocus processes typically involves a computing system (e.g., a processor) operating a mechanical lens system to adjust the focus settings of the lens (e.g., to change the focusing distance or depth of field), and then analyzing whether or not the resulting image from an autofocus sensor is in focus. If the resulting image is not satisfactorily in focus, then the computing system again adjusts the focus settings and evaluates the focusing characteristics in the resulting image. In some implementations, each adjustment to the focus settings may be determined based on some measure of how out of focus the image is (or how out of focus a particular portion of the image is). In other implementations, the adjustments may be predetermined. In either case, this process may be repeated until the resulting image is deemed to be satisfactorily in focus.

As noted above, some cameras, such as DSLRs, may include dedicated autofocus systems, which may include one or more sensors that are dedicated to autofocus. Such cameras typically do not use the image sensor, which is used to capture images, for purposes of autofocus. Further, such cameras typically include PD-AF systems, in which light received through the lens is split into a pair of images. Both of the images in the pair may then be directed onto the autofocus sensor and analyzed to determine whether or not the lens is in focus. The focus position of the lens may then be adjusted until proper focus is detected.

One common system PD-AF system is a through-the-lens, second-image registration, phase detection (SIR PD-AF) system. An SIR PD-AF system utilizes a beam splitter to direct incoming light towards an autofocus sensor. More specifically, micro-lenses that are located on opposite sides of the lens may direct light from coming from the opposite sides of the lens towards the autofocus sensor, which effectively creates a rangefinder, with two images being projected onto the autofocus sensor. The images formed by the two micro-lenses are then compared to determine a separation error, which is evaluated to determine whether the lens is focused correctly. If the separation error indicates that the subject is out of focus (e.g., if the separate error is not zero or within some threshold from zero), then an adjustment to the focus settings may be calculated based on the separation error, and the lens may be moved according to the adjusted settings (e.g., by moving the lens assembly or a lens element closer to or further from the sensor).

When size and/or cost of components are significant in the design of a device, the device may utilize a camera system that does not include a separate autofocus system. Such is the case with many mobile phones and/or tablet computers, which often include camera systems that use the same image sensor for both autofocus and image capture. In many cases, cameras in portable devices such as mobile phones and tablets use CD-AF for purposes of focusing.

While CD-AF systems can use a separate sensor that is dedicated to autofocus, most CD-AF systems use the same image sensor for both image capture and autofocus. CD-AF systems determine whether or not a subject is in focus by measuring the contrast in the image that is detected on the sensor. To do so, a CD-AF system may evaluate the change in contrast at various points in the image, with higher contrast being interpreted as an indication of a sharper image.

More specifically, the difference in intensity between adjacent pixels of a sensor is generally greater when the subject captured in the adjacent pixels is in focus, as compared to when image subject is out of focus. Further, a CD-AF system may measure the contrast at specific pixels, or determine the average over certain groups of pixels. In either case, a CD-AF system may then adjust focus settings until a threshold contrast is detected (and possibly until a maximum contrast is detected). For example, an illustrative CD-AF system may pass image data through a high pass filter, and adjusts the focus of the lens until the output from the filter exceeds a threshold (and possibly until the output of the filter is at its highest level).

Further, the focus setting for a scene may be defined as or otherwise indicate the distance between the focusing element of the lens and the sensor (e.g., the focus position) that results in proper focus. Further, the focus position is typically proportional to (or at least a function of) the distance to the subject or area of the scene that is being focused on. Note that herein, the distance between the lens and a particular subject or object may be referred to as the "object distance." As such, a computing system on a device may determine the object distance based on the focus position.

In an illustrative embodiment, a multi-camera device, such those shown in FIGS. 1A to 1E, may use one of its cameras to perform an autofocus process to achieve proper focus for a scene. The device may then use the focus position that achieved proper focus to determine an object distance for the scene. The object distance may then be used to determine a desirable baseline for capturing stereo image data of the scene. Accordingly, the device may select one of its camera pairs in accordance with the desirable baseline. For example, in some implementations, the device may select the camera pair with a baseline that is closest to the desirable baseline. In other implementations, the device might select a camera pair with a baseline that is acceptably close to the desirable baseline (but perhaps not the closest) and also satisfies other selection criteria. In any case, the device may then operate the selected camera pair to capture stereo image data of the scene.

III. Illustrative Methods For Selecting A Camera Pair For Stereoscopic Imaging

Figure 3:
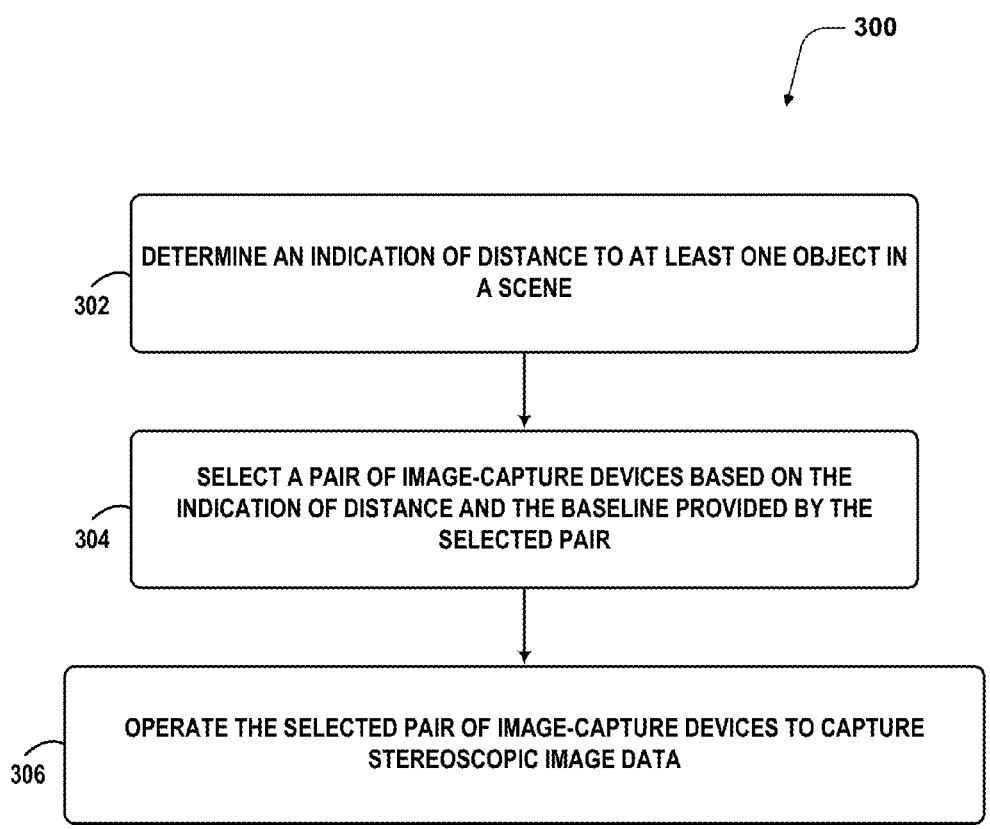
FIG. 3 is a flow chart illustrating a method, in accordance with an example embodiment.

FIG. 3 is a flow chart illustrating a method 300 for stereoscopic imaging, according to an example embodiment. Method 300 may be implemented by a device that includes three or more cameras oriented in the same direction, where each camera is separated by the other cameras by some distance, such as the devices shown in FIGS. 1A to 1E. Such a device may include three or more image-capture devices (e.g., three or more cameras), which provide two or more baselines for stereoscopic imaging. As such, method 300 may be implemented in order to dynamically select a camera pair for stereoscopic imaging with a baseline that is appropriate for capturing a particular scene.

As shown by block 302, method 300 involves a computing device determining an indication of distance to at least one object in a scene. The computing device may then select a pair of image-capture devices from two or more possible pairs based on the indication of distance and the baseline provided by the selected pair, as shown by block 304. The computing device may then operate the selected pair of image-capture devices to capture stereoscopic image data, as shown by block 306.

In an example embodiment, method 300 is carried out on a device in which a first of the baselines provided by its image-capture devices is non-parallel to a second of the baselines. More specifically, at least three cameras on the device have a non-linear arrangement, thus providing at least two baselines that are not parallel to one another.

A. Determining an Indication of Distance

At block 302, in order to determine the indication of distance to the subject, the computing device may determine at least one focus setting that causes the subject to be in focus. In particular, the focus setting may be the focus position of the lens when the scene is determined to be properly in focus; although other types of focus settings may be used.

Since the focus position that causes an object to be in focus may be inversely proportional or otherwise mathematically related to the distance to the object, the in-focus focus position may in fact serve as an indication of distance to an object or objects, even though the focus position is not a measure of the actual distance to the object. Alternatively, the actual distance to an object may be determined based on the in-focus focus position. The actual distance to the object may then be used as a basis for selecting a camera pair for stereoscopic imaging.

Other techniques and/or systems could also be used to determine an indication of distance for a scene (or to a particular object or objects in a scene). For example, a device could include a low-resolution depth sensor that determines depth information using time-of-flight or structured light techniques. Other techniques and/or systems for determining depth information are also possible.

B. Selecting a Camera Pair from Multiple Camera Pairs

To select a particular pair of image-capture devices at block 304, the computing device may use a focus-setting-to-baseline database to determine a camera pair with a baseline that corresponds to the determined focus setting. Such a focus-setting-to-baseline database may map focus-position ranges to certain baselines.

For example, object distances may be broken into three groups, such as a near range (e.g., for macro imaging), a far range (e.g., for telephoto imaging), and a middle range encompassing object distances between the near and far range. Further, a range of focus positions may be determined that corresponds to each object-distance range. As such, the focus-setting-to-baseline database may map the range of focus position that corresponds to each object-distance range, to a baseline that is desired for each object-distance range. The computing device may then select the pair of image-capture devices that corresponds to the desired baseline (e.g., the pair that provides a baseline that most-closely matches the desired baseline).

A mapping of focus settings to various baselines may be designed for a specific purpose, such as to facilitate the creation of a 3D image from the stereo image pair. For example, if a stereo image pair is captured using a "human" baseline (e.g., between 50 mm and 80 mm), then the depth portrayed in the resulting 3D image may cause the human brain to interpret the scene as being sized in the same manner as it is in the real world. However, to provide a viewable stereoscopic image where the portrayed depth makes the scene (or portions thereof) appear smaller than the actual real-world size, the underlying stereoscopic image data may be captured with a wider baseline (e.g., greater than 80 mm). Conversely, to provide a viewable stereoscopic image where the portrayed depth makes the scene (or portions thereof) appear smaller than the actual real-world size, the underlying stereoscopic image data may be captured with a narrower baseline.

In some embodiments, the device may utilize a focus-setting-to-distance database instead of using a focus-setting-to-baseline database. In particular, the device may include or have access to a focus-setting-to-distance mapping, which indicates particular distances or distance ranges associated with particular focus settings. Accordingly, the device may use the focus-setting-to-distance mapping to determine an indication of distance for the scene (e.g., an average or median distance) and/or to determine distance(s) to particular object(s) or portion(s) of the scene. The device may then use a distance-to-baseline model to determine one or more camera pairs that have the most desirable baseline or baselines with which to capture a scene, given the distance information for the scene.

In some embodiments, to select a particular pair of image-capture devices at block 304, a computing device may use a focus-setting-to-camera-pair mapping, which directly maps focus position ranges to particular camera pairs. Such a focus-setting-to-camera-pair mapping may allow for the camera pair to be selected in an even more direct manner than when a focus-setting-to-baseline mapping is used. In particular, the camera pairs may be mapped to particular focus positions such that the appropriate baselines with which to capture objects at different distances are built into the focus-setting-to-camera-pair mapping.

In some embodiments, the computing device may further base the selection of a camera pair on the orientation of the device (or the orientation of the particular camera pair) with respect to the ground. More specifically, when the purpose of camera-pair selection is to capture stereo images from which a viewable 3D image can be generated, it may be desirable to select two cameras having a baseline that lies in a plane parallel to the ground, or at least is as close as parallel with the ground as possible. Accordingly, at block 304, the computing device may limit the set of camera pairs from which a camera pair is selected, to only those camera pairs with a baseline in a plane parallel to the ground or within a certain tolerable angular range from the plane parallel to the ground.

Further, note that in a device such as a mobile phone, the set of pairs that sufficiently close to parallel with the ground may vary, depending on how the device is held. With this in mind, the layout of the camera lenses on a device might be designed for common handheld orientations, such as horizontal and vertical orientations of the device. The layout of the camera lenses on a device might be designed for other more creative usages, such as holding those that involve holding the camera diagonally with respect to the ground. For example, referring to FIG. 1E, different camera pairs that include one camera from axis 184X (e.g., one camera from cameras 182A to 182D) and one camera from axis 184Y (e.g., one camera from cameras 182F to 182I) may be parallel to the ground when the camera is held at a different angles, diagonal to the ground.

For example, the arrangement of cameras 182A to 182I in FIG. 1E may provide a number of different baselines for both a vertical orientation and a horizontal orientation of device 180. Specifically, if the device 180 is held in a horizontal position (perpendicular to the positions shown in FIG. 1E), the baselines provided by different combinations of cameras 182A to 182I, which lie along axis 184Y, will be substantially parallel to the ground. As such, when the device 180 is held horizontally, the baseline might be selected from the set of baselines provided by cameras 182A to 182E. On the other hand, if the device 180 is held in a vertical position, the baselines provided by different combinations of cameras 182A to 182I, which lie along axis 184X, will be substantially parallel to the ground. As such, when the device 180 is held vertically, the baseline might be selected from the set of baselines provided by cameras 182E to 182I. Other examples are also possible.

C. Determining a Desired Baseline

In some cases, the desired baseline for stereoscopic imaging may vary, depending on the purpose for which the stereo image data is being used. Accordingly, an example method such as method 300 may further involve dynamically determining the desired baseline for a particular scene based on focus setting and/or other factors (instead of using a simple focus-setting-to-baseline mapping).

In some cases, the desired baseline for a given scene may vary in accordance with the purpose of the stereo image capture. For instance, when a stereo image pair is being captured to create a viewable stereoscopic image, then the computing device may determine a desirable baseline such that the resulting stereo image pair can be combined into a viewable stereoscopic image having certain desired characteristics. As an example, consider that when a viewable stereoscopic image is generated from an image pair captured with a "human" baseline (e.g., between 50 mm and 80 mm), the brain interprets the stereoscopic image as being of its original size. Thus, method 300 is implemented to facilitate the creation of a viewable stereoscopic image that accurately portrays the depth of the scene, as it appears to someone who is actually at the scene, then a device may determine the desired baseline be a "human" baseline.

However, there are times when it may be desirable for a viewable stereoscopic image to present a scene such that it is perceived differently than if viewing the actual scene. For instance, when capturing a stereo image pair to create a close-up or macro stereoscopic image, it may be desirable to "enlarge" the scene, perceptually, by using a narrower baseline to capture the stereo image pair. In other words, when a stereo image pair is captured using a narrower baseline (e.g., less than 50 mm), a viewable stereoscopic image generated therefrom will be perceived as having less depth (e.g., less distance between objects) than if viewed by human eyes at the location where the stereo image pair was captured. On the other hand, when capturing a scene with a distant subject or subjects (e.g., a mountain range or a city skyline), it may be desirable to "shrink" the scene, perceptually, by using a wider baseline to capture the stereo image pair. In other words, when a stereo image pair is captured using a wider baseline (e.g., greater than 80 mm), a viewable stereoscopic image generated therefrom will be perceived as having more depth (e.g., more distance between objects) than if viewed by human eyes at the location where the stereo image pair was captured.

In a further aspect, if stereo imaging is being performed in order to determine depth information for a particular scene, then the computing device may determine a desired baseline or baselines that facilitates extraction of depth information from a stereo image pair of the particular scene. For example, if stereo image pairs are being captured to generate an accurate depth map of a scene; the depth map may be more accurately determined (and possibly more efficiently accomplished) when the amount of parallax can be controlled. More specifically, in a distant scene, a human-eye-like baseline might not be enough to see much parallax, and in a very close scene, the parallax might be too much (e.g., such that the left and right "eye" are seeing completely different objects, in an extreme case). By dynamically selecting the baseline (e.g., narrower for near scenes, and wider for far scenes), the device can, in a sense, "normalize" the distance of the scene, leading to better depth information.

Note that improved depth information may be useful in a number of applications. For example, improved depth information may be used in refocusing techniques (e.g., simulating a narrow depth of field, or changing the depth of the focal plane), to produce a new image from a shifted point of view, to improve depth-assisted segmentation of a scene, to apply a fog effect, to extract surface normals, to tease apart lighting versus surface colors, and/or to generate a 3D simulation of flying through a scene, among other possibilities.

Yet further, if the selected stereo image pair is being used both to create a viewable stereoscopic image and to determine depth information, the computing device may determine a target difference based on the desirable differences for both of these purposes. Note that these reasons for selecting image data from a certain camera pair are not mutually exclusive. Specifically, a stereo image pair may be selected that facilitates both the creation of a viewable stereoscopic image and the generation of depth information for the scene, at the same time. In other cases, processes to select a stereo image pair for both purposes could run in parallel, and a different stereo image pair could be selected for each purpose.

IV. Methods For Testing Multiple Camera Pairs For Stereoscopic Imaging

Figure 4A:
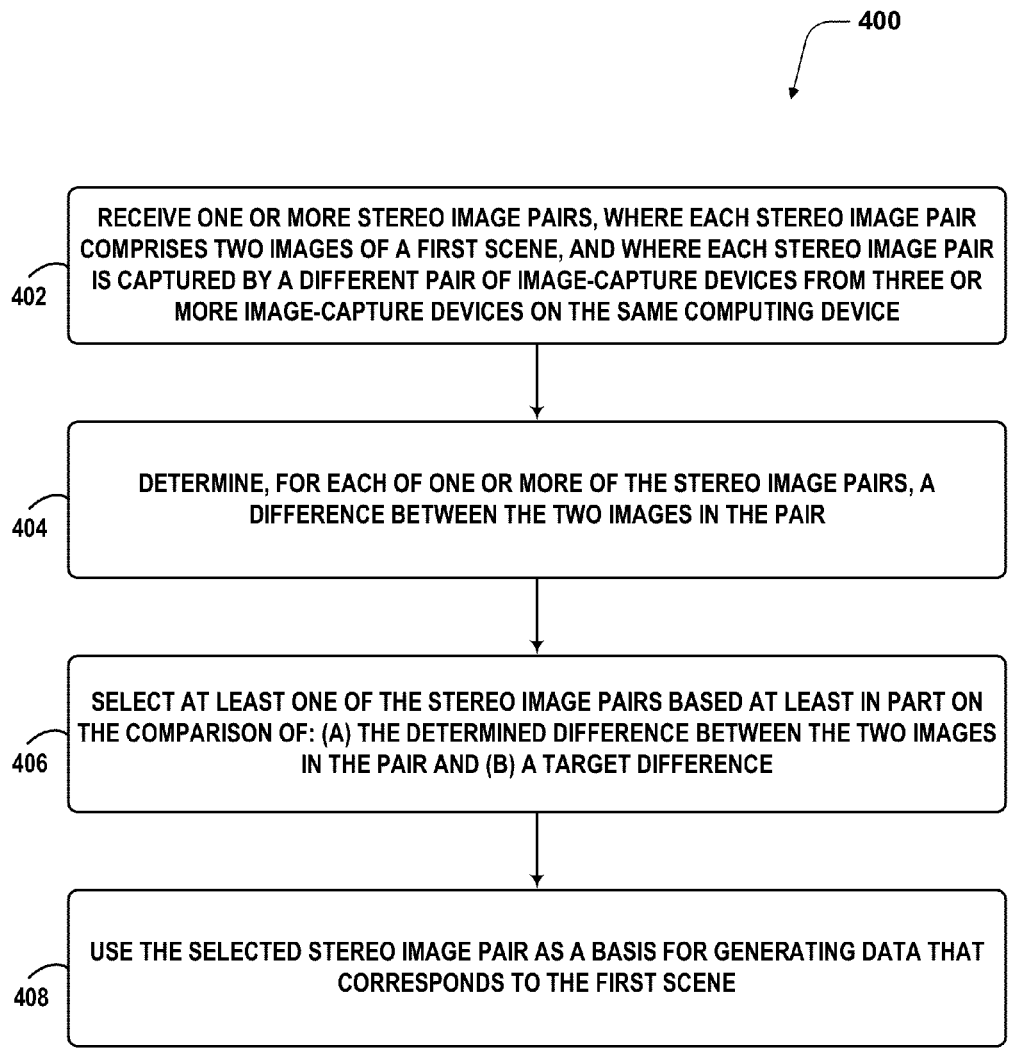
FIG. 4A is a flow chart illustrating another method, in accordance with an example embodiment.

FIG. 4A is a flow chart illustrating a method 400 for image capture, according to an example embodiment. In particular, method 400 may be implemented by a device that includes three or more cameras oriented in the same direction and separated by some distances from one another such that the three or more cameras provide two or more different baselines for stereoscopic imaging. Such a device may implement method 400 in order to dynamically select an image pair from image pairs captured using different baselines.

In particular, method 400 involves a computing device receiving one or more stereo image pairs, where each stereo image pair comprises two images of a first scene, and where each stereo image pair is captured by a different pair of image-capture devices from three or more image-capture devices on the same computing device, as shown by block 402. Note that the computing device that performs block 402 and/or other portions of method 400 may be the same computing device that includes the three or more image-capture devices (e.g., a mobile phone), or may be a different computing device (e.g., a cloud server in communication with a mobile device that captures the image data).

The computing device may determine, for each of one or more of the stereo image pairs, a difference between the two images in the pair, as shown by block 404. The computing device may then select at least one of the stereo image pairs based at least in part on the comparison of: (a) the determined difference between the two images in the pair and (b) a target difference, as shown by block 406. The computing device may then use the selected stereo image pair as a basis for generating data that corresponds to the first scene, as shown by block 408.

Note that there are differences between methods 300 and 400 that may make it advantageous to use one method or the other, depending upon the scenario. For instance, because method 300 uses the focus settings to determine a desirable baseline for capturing a scene, method 300 may be carried out before a stereo image pair is actually captured. On the other hand, method 400 evaluates actual stereo image pairs that have been captured using different baselines. As such, method 400 may require that more than one stereo image pair be captured before a device finds a stereo image pair with a satisfactory difference. However, method 400 may be able to select a camera pair, and generate the desired stereo image pair, without utilizing an autofocus function. Further, method 400 may allow for selection of a camera pair in a single frame, which traditional AF-based techniques may not allow for. On the other hand, method 300 may be used to determine the appropriate camera pair for stereoscopic imaging before capturing any stereo image pairs, and thus may be more efficient, so long as a device includes adequate autofocus functionality (otherwise, method 400 may be better suited for the device).

In a further aspect, in a scenario where a device includes three or more cameras, one camera could be designated as a primary camera. The two or more other cameras could then use exemplary methods, such as method 300 or 400 (or possibly portions thereof), to determine depth information for a scene, while the primary camera is recording a video of the scene. The depth information may then be used in an autofocus process for the primary camera, which adjusts the focus settings of the primary camera one or more times during the recording, such that focus hunting by the first camera is eliminated or reduced while recording the video.

A. Concurrent Evaluation of Stereo Image Pairs Captured by Multiple Camera Pairs In some embodiments, at blocks 402 and 404, the computing device may receive and evaluate the respective difference for two or more stereo image pairs, before selecting one of the image pairs at block 406. For example, a device may utilize two or more camera pairs, which each provide a different baseline, to capture two or more stereo image pairs. The two or more stereo image pairs may all be received at block 402. Then, at block 404, the computing device may determine the respective difference for all of the stereo image pairs. And, at block 406, the computing device may select the stereo image pair for which the respectively determined difference varies the least from the target difference.

In such embodiments, the computing device may determine and compare the respective differences for multiple stereo image pairs in parallel (and possibly for all stereo image pairs). Alternatively, the computing device may determine and compare the difference for one stereo image pair at a time, until it has determined a respective difference for all the stereo image pairs, at which point the device may select the stereo image pair for which the respectively determined difference varies the least from the target difference.

B. Evaluating Stereo Image Pairs Captured by One Camera Pair at a Time

Figure 4B:
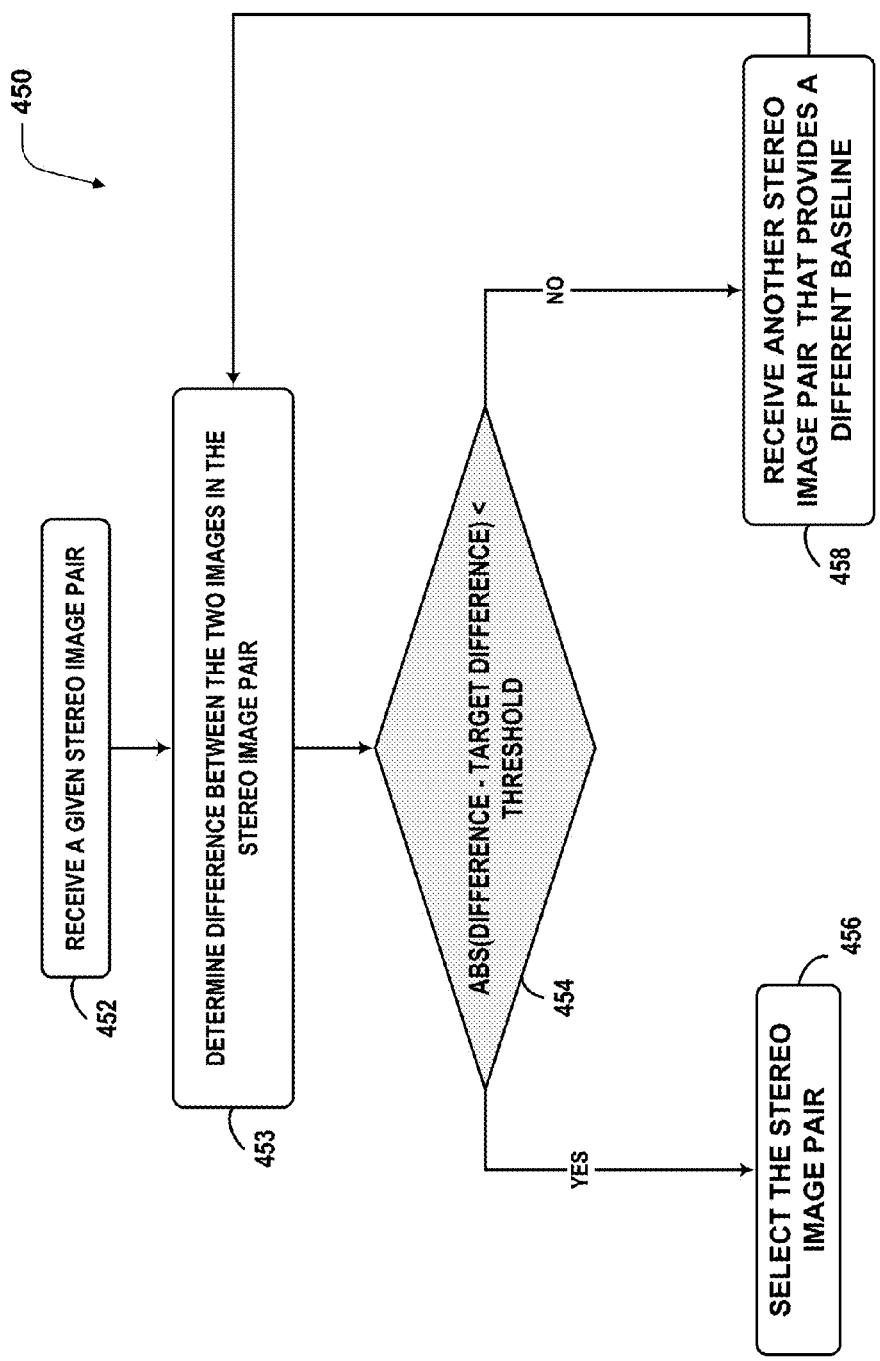
FIG. 4B is a flow chart illustrating another method, in accordance with an example embodiment.

In some embodiments, at blocks 402 to 406, the computing device may iteratively evaluate the difference for one image pair at a time, and select the first pair for which the determined difference meets certain criteria. For example, FIG. 4B is a flow chart illustrating a method 450 for selecting a stereo image pair, according to an example embodiment. Method 450 may be implemented at blocks 402 to 406 of method 400, in order to iteratively evaluate image-pair differences for image pairs captured with different baselines, one image pair at a time, and select the first image pair that is deemed acceptable.

More specifically, as shown by block 452, the computing device may receive a given stereo image pair. The computing device may then determine a difference between the two images in the given stereo image pair, as shown by block 453. The computing device may then determine whether or not the difference between the images in the given stereo image pair varies from the target difference by less than a threshold, as shown by block 454. If the difference between the images in the given stereo image pair varies from the target difference by less than the threshold, then the computing device selects the given stereo image pair, as shown by block 456. Otherwise, the computing device may receive another stereo image pair that provides a different baseline, as shown by block 458. The computing device may then repeat blocks 453 and 456 one or more other stereo image pairs until one of the stereo image pairs is determined to have a difference that varies from the target difference by less than the threshold and selected at block 456.

In an illustrative embodiment, the computing device may operate a first camera pair to capture the first stereo image pair, which is received at block 452. Then, if difference for the first image pair is not satisfactory, the computing device may select a different camera pair, having a different baseline from any previously utilized camera pair, to capture the next stereo image pair to be evaluated. Accordingly, the computing device may utilize a camera pair with a different baseline during each iteration of method 450.

C. Determining a Difference Between the Two Images in an Image Pair

At block 404, various techniques may be utilized to determine the difference between the two images in a given stereo image pair. In some embodiments, the computing device may compute the difference over the entire scene. In other embodiments, the computing device may compute the difference using only certain target areas in the scene (e.g., areas that are determined to include subjects of interest), or may place a greater weight on such target areas when computing the difference for the scene. For example, greater weight may be placed on a center area in the scene, areas where faces are other objects of interest are detected, or areas that a user has manually identified, among other possibilities.

In some cases, determining the difference between two images may involve determining, for each pixel in the image frame, the absolute value of the pixel value in one image minus the corresponding pixel value in the other image. The difference may then be determined by summing the absolute pixel differences. Further, in some cases, calculating the difference between the two images, or between corresponding portions of the two images, may involve determining the disparity between the two images, using one or more of various well-known techniques for determining disparity.

D. Use of the Selected Stereo Image Pair to Generate Data for the First Scene

At block 408, a computing device may generate various types of data corresponding to a scene, and may use various techniques to do so. For instance, the computing device may combine the selected stereo image pair to create a viewable stereoscopic image. Additionally or alternatively, the computing device could analyze the stereo image pair to determine depth information for the scene. In some embodiments, the computing device may go as far as to build a depth map for the entire scene that is captured in the stereo image pair.

E. Determining a Target Difference

Note that the desired difference between the images in a stereo image pair may vary, depending on the purpose for which the stereo image data is being used. Accordingly, method 400 may further involve determining the target difference for the first scene. In particular, the computing device may dynamically determine the target difference, so that stereo image pairs captured with different baselines can be evaluated in an effort to select the image pair that best suits the purpose for which the stereo image pair is being selected, given the characteristics of the particular scene that is being captured.

For instance, if the selected stereo image pair is being combined to create a viewable stereoscopic image, then the computing device may determine a target difference that facilitates the creation of the viewable stereoscopic image of the particular scene. Further, if the selected stereo image pair is being evaluated to determine depth information for the scene, then the computing device may determine a target difference that facilitates (and hopefully maximizes) extraction of depth information from the stereo image pair.

Yet further, if the selected stereo image pair is being used both to create a viewable stereoscopic image and to determine depth information, the computing device may determine a target difference based on the desirable differences for both of these purposes. Alternatively, different stereo image pairs could be selected to create a viewable stereoscopic image and to determine depth information, possibly via parallel selection processes.

V. Conclusion

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method for image capture comprising:
   determining, by a computing device, an indication of distance to an object in a scene, wherein the computing device comprises three or more image-capture devices that provide two or more baselines for stereoscopic imaging, wherein at least two pairs of image-capture devices from the three or more image-capture devices are operable for stereoscopic imaging, wherein each pair provides one of the baselines, and wherein a first of the baselines is non-parallel to a second of the baselines;

determining, by the computing device, one or more pairs of image-capture devices, from among the at least two pairs of image-capture devices, that each respectively provide a baseline in a plane substantially parallel to a ground;

selecting, by the computing device, a first pair from the determined one or more pairs of image-capture devices that each respectively provide a baseline in a plane substantially parallel to the ground, wherein the first pair is selected based on the indication of distance and the baseline provided by the first pair; and operating the first pair of image-capture devices to capture stereoscopic image data.

2. The method of claim 1, wherein all of the three or more image-capture devices are arranged on a first surface of the computing device.

3. The method of claim 1, wherein the computing device is mobile device.

4. The method of claim 1, wherein each of the three or more image-capture devices comprises a respective lens, wherein all of lenses are arranged in a plane.

5. The method of claim 1, wherein determining the indication of distance to the object comprises determining at least one focus setting that causes the object to be in focus.

6. The method of claim 5, wherein selecting the first pair of image-capture devices comprises:

using a focus-setting-to-baseline database to determine a desired baseline that corresponds to the determined focus setting; and determining that the first pair of image-capture devices corresponds to the desired baseline.

7. The method of claim 5, wherein determining the indication of distance to the object further comprises determining a distance or distance range that corresponds to the at least one focus setting that causes the object to be in focus.

8. The method of claim 1, further comprising:

determining, by the computing device, an orientation of the computing device relative to the ground, wherein determining the one or more pairs of image-capture devices that each respectively provide a baseline in a plane substantially parallel to the ground is based at least on the determined orientation of the computing device relative to the ground.

9. An apparatus comprising:

three or more image-capture systems, wherein lenses of the image-capture systems are all arranged on a first surface of the apparatus and oriented in substantially the same direction, wherein the three or more image-capture systems provide two or more baselines for stereoscopic imaging, wherein at least two pairs of image-capture devices from the three or more image-capture devices are operable for stereoscopic imaging, wherein each pair provides one of the baselines, and wherein a first of the baselines is non-parallel to a second of the baselines; and a control system configured to:
(a) determine an indication of distance to an object in a scene;
(b) determine one or more pairs of image-capture devices, from among the at least two pairs of image-capture devices, that each respectively provide a baseline in a plane substantially parallel to a ground;
(c) select a first pair from the determined one or more pairs of image-capture devices that each respectively provide a baseline in a plane substantially parallel to the ground, wherein the first pair is selected based on the indication of distance and the baseline provided by the first pair; and
(d) operate the first pair of image-capture devices to capture stereoscopic image data.

10. The apparatus of claim 9, wherein all of the three or more image-capture devices are arranged on a first surface of a computing device.

11. The apparatus of claim 9, wherein, to determine the indication of distance to the object, the control system is configured to determine at least one focus setting that causes the object to be in focus.

12. The apparatus of claim 9, wherein, to select the first pair of image-capture devices, the control system is configured to:

use a focus-setting-to-baseline database to determine a desired baseline that corresponds to the determined focus setting; and determine that the first pair of image-capture devices corresponds to the desired baseline.

13. The apparatus of claim 9, wherein the control system is further configured to:

determine an orientation of a computing device relative to the ground, wherein all of the three or more image-capture devices are arranged on the computing device, and wherein determining the one or more pairs of image-capture devices that each respectively provide a baseline in a plane substantially parallel to the ground is based at least on the determined orientation of the computing device relative to the ground.

* * * * *